United States Patent
Tiefenthaler

(10) Patent No.: US 7,939,767 B2
(45) Date of Patent: May 10, 2011

(54) CONDUIT BODY

(76) Inventor: Ryan Tiefenthaler, Butte, NE (US)

( * ) Notice: Subject to any disclaimer, the term of this patent is extended or adjusted under 35 U.S.C. 154(b) by 212 days.

(21) Appl. No.: 12/384,845

(22) Filed: Apr. 9, 2009

(65) Prior Publication Data

US 2010/0258345 A1 Oct. 14, 2010

(51) Int. Cl.
*H02G 3/08* (2006.01)

(52) U.S. Cl. ......... 174/481; 174/480; 174/68.1; 174/24; 439/207; 248/300; 24/546

(58) Field of Classification Search .................. 174/481, 174/480, 68.1, 68.3, 96, 24; 439/207, 582; 52/220.1; 248/300; 220/3.8; 24/546
See application file for complete search history.

(56) References Cited

U.S. PATENT DOCUMENTS

| | | | | |
|---|---|---|---|---|
| 1,777,504 | A * | 10/1930 | Selah | 220/3.8 |
| 4,616,104 | A * | 10/1986 | Lindsey | 174/503 |
| 5,360,130 | A * | 11/1994 | Lehmann et al. | 220/3.8 |
| RE35,075 | E | 10/1995 | Lammens, Jr. | |
| 6,580,029 | B1 | 6/2003 | Bing | |
| 7,435,905 | B1 | 10/2008 | Elder | |

\* cited by examiner

*Primary Examiner* — Dhiru R Patel
(74) *Attorney, Agent, or Firm* — Dennis L. Thomte; Thomte Patent Law Office, LLC

(57) ABSTRACT

A conduit body is described which includes an integrally formed nipple extending from the back wall of the body portion of the conduit body. The exterior surface of the nipple has threads formed thereon. The nipple being adapted to be cut to length with respect to different wall thicknesses of a building through which a nipple is extended to enable electrical wires to be extended through the building wall into an electrical panel or the like.

15 Claims, 4 Drawing Sheets

CONDUIT BODY

BACKGROUND OF THE INVENTION

1. Field of the Invention

This invention relates to a conduit body and more particularly to a conduit body having an elongated, externally threaded nipple extending therefrom which is adapted to be inserted through a wall of a building structure with the nipple being received within an electrical panel or the like positioned at or embedded in the inside surface of the building wall. Even more particularly, this invention relates to a conduit body including an elongated nipple extending therefrom with the nipple being able to be cut to length to compensate for various wall thicknesses of the building wall and compensate for whether the electrical panel at the inside surface of the building wall is embedded therein or not.

2. Description of the Related Art

In many construction scenarios, a building under construction has electrical wires extending underground from a utility box at the lot line of the property to a location adjacent a wall of the building. The electrical wires normally extend through elongated conduits with the terminal ends of the conduits being vertically disposed adjacent the exterior surfaces of the wall of the building. An opening is formed in the wall of the building which communicates with an electrical panel therein which is either positioned on the interior surface of the wall of the building or which is embedded in the interior of the wall.

Normally, a conduit body is positioned at the exterior surface of the wall of the building and has a conduit coupling at its lower end to permit the electrical wires to extend upwardly therethrough into the interior of the conduit body. Normally, the back wall of the conduit body has a conduit coupling extending rearwardly from the back wall of the panel so that a conduit may be secured thereto by gluing or the like so as to extend through an opening in the wall of the building to the electrical panel. Usually, a conduit is glued onto or into the conduit coupler at the back wall of the conduit body. Gluing the conduit into or onto the conduit coupling requires time for the glue to dry before other connections may be made. Additionally, the thickness of the building wall may, and usually does, vary thereby possibly requiring more than one glue step. Additionally, the glue connection may fail requiring additional labor costs.

The conduit bodies are normally provided as a way to conveniently pull the electrical wires from their underground location, upwardly through the conduit body, and thence rearwardly from the conduit body into the panel at the inside surface of the building wall.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A conduit body is described for enabling electrical or telecommunication wires which extend upwardly from the ground adjacent the outside of a building wall and to be extended through an opening in the building wall and received within an electrical or telecommunications panel positioned at the interior surface of the building wall. The conduit body includes a generally hollow rectangular body portion having a back wall, a top wall, a bottom wall, a first side wall, a second side wall and an open front. The open front of the body portion is closed by a selectively removable cover member. The bottom wall has a first opening formed therein and the back wall has a second opening formed therein. A hollow conduit coupling hub is integrally formed with the bottom wall and extends downwardly from the first opening thereof to define a first conduit passageway into the interior of the body portion.

An elongated hollow nipple, with exterior threads and having first and second ends, is integrally formed with the back wall of the conduit body and extends rearwardly from the second opening to define a second conduit passageway. The body portion, coupling hub and nipple are of one-piece molded plastic construction.

In the preferred embodiment, the nipple of the conduit body has a length of approximately 12-16 inches and is designed so that it may be cut to length so that the outer end of the nipple does not objectionably protrude intrude into the electrical panel. A threaded lock nut is threadably secured to the inner end of the nipple for engagement with the inside surface of the back wall of the electrical panel to draw the electrical panel and the conduit body into close engagement with the outside surface of the building wall and the inside surface of the back wall of the electrical panel.

The method of using the conduit body of this invention is also described.

It is therefore a principal object of this invention to provide an improved conduit body.

A further object of the invention is to provide a conduit body having an elongated nipple integrally formed with the back wall thereof and which has exterior threads formed thereon and which extends from the back wall of the body portion of the conduit body through an opening in the wall of the building structure into an electrical panel or the like with means being included to secure the components together. The nipple may be cut to length to compensate for different wall thicknesses and panel positions.

Yet another object of the invention is to provide a conduit body which, with exception of the cover thereof, is formed of a one-piece integrally formed plastic material.

Yet another object of the invention is to provide a conduit body which is easily adapted to accommodate wall structures of various thicknesses.

These and other objects will be apparent to those skilled in the art.

Figure 1:
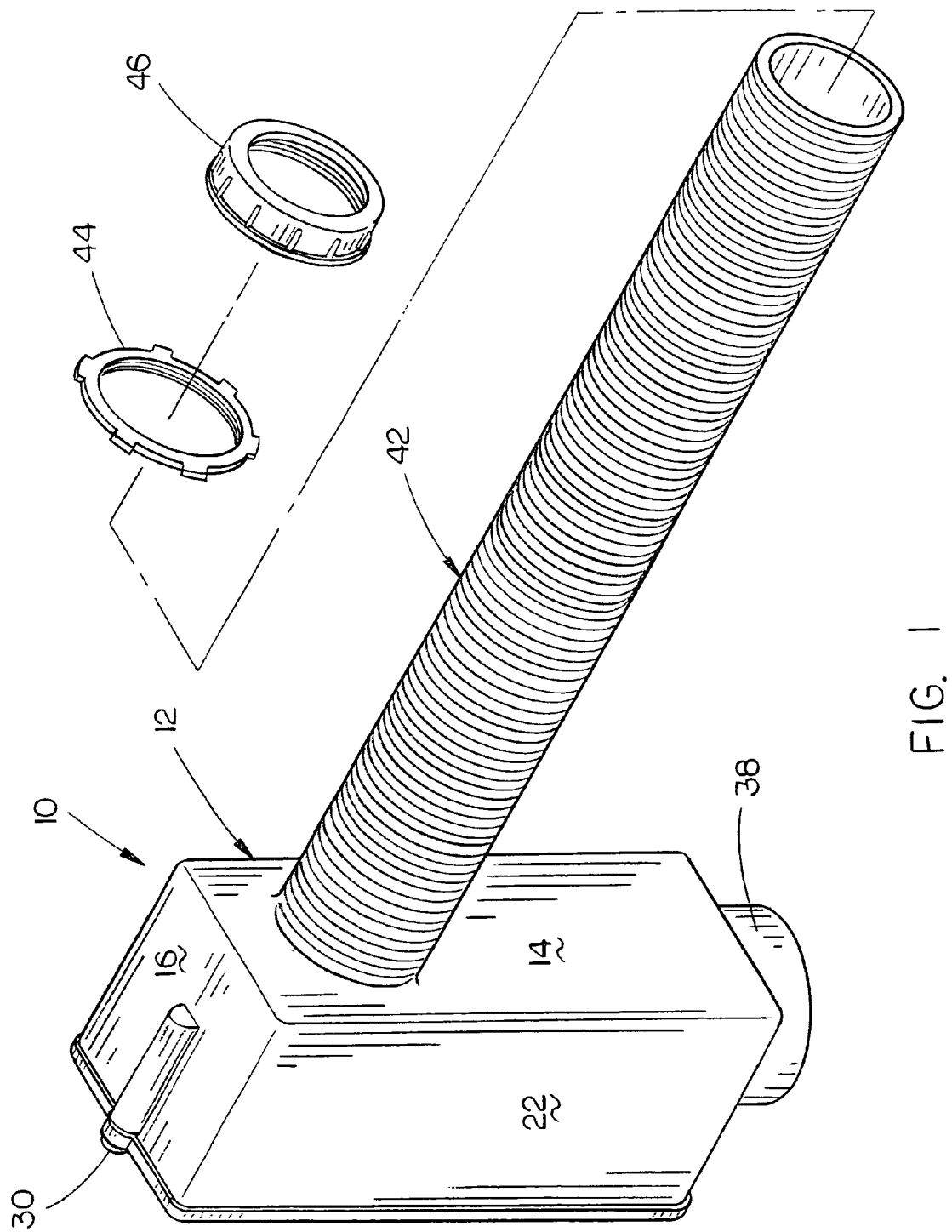
FIG. 1 is a rear perspective view of the conduit body of this invention.

Non-limiting and non-exhaustive embodiments of the present invention are described with reference to the follow-

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The conduit body of this invention is referred to generally by the reference numeral 10 and which includes a generally rectangular body portion 12. Although the body portion 12 will normally have a generally rectangular shape, it could be oblong, square, etc. Body portion 12 includes a back wall 14, top wall 16, bottom wall 18, side walls 20 and 22 and an open front 24. Body portion 12 also has a pair of elongated openings 26 and 28 formed therein which are adapted to receive screws 30 and 32 to enable cover 34 to seal and close the open front of the body portion 12.

Bottom wall 18 has an opening 36 formed therein which communicates with a hollow conduit coupling 38 which extends downwardly from bottom wall 18. Although coupling 38 is shown to be located on the bottom wall 18, there may be some occasions where the conduit coupler 38 may be located on one of the side walls of the body portion.

Figure 2:
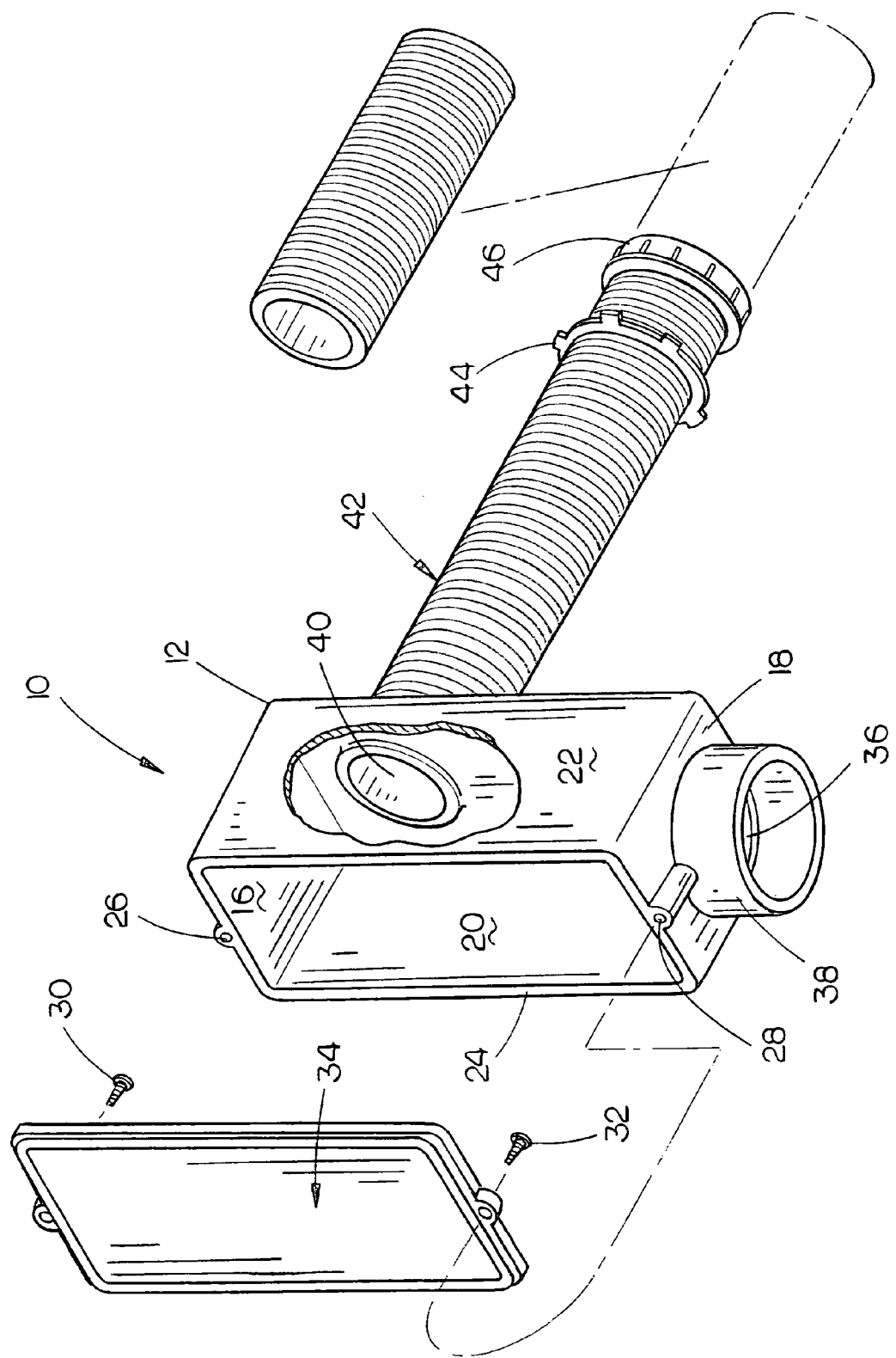
FIG. 2 is a partially exploded perspective view of the conduit body of this invention illustrating the manner in which the portion of the nipple of the conduit body may be removed to compensate for different wall thicknesses.

Back wall 14 has an opening 40 formed therein as seen in FIG. 2. The numeral 42 refers to an elongated nipple which is integrally formed with body portion 12 and which extends rearwardly from opening 40. Preferably, the nipple 42 will have a length of 12-16 inches with the nipple 42 being cut-to-length at the job site as will be described in more detail hereinafter.

Conduit body 12, coupling 38 and nipple 42 are molded as a one-piece integrally formed component of plastic construction. The numeral 44 refers to a metal lock nut which preferably may be threaded onto nipple 42. The numeral 46 refers to a preferably plastic bushing which is threaded onto the end of nipple 42 as will also be described in more detail hereinafter.

Figure 3:
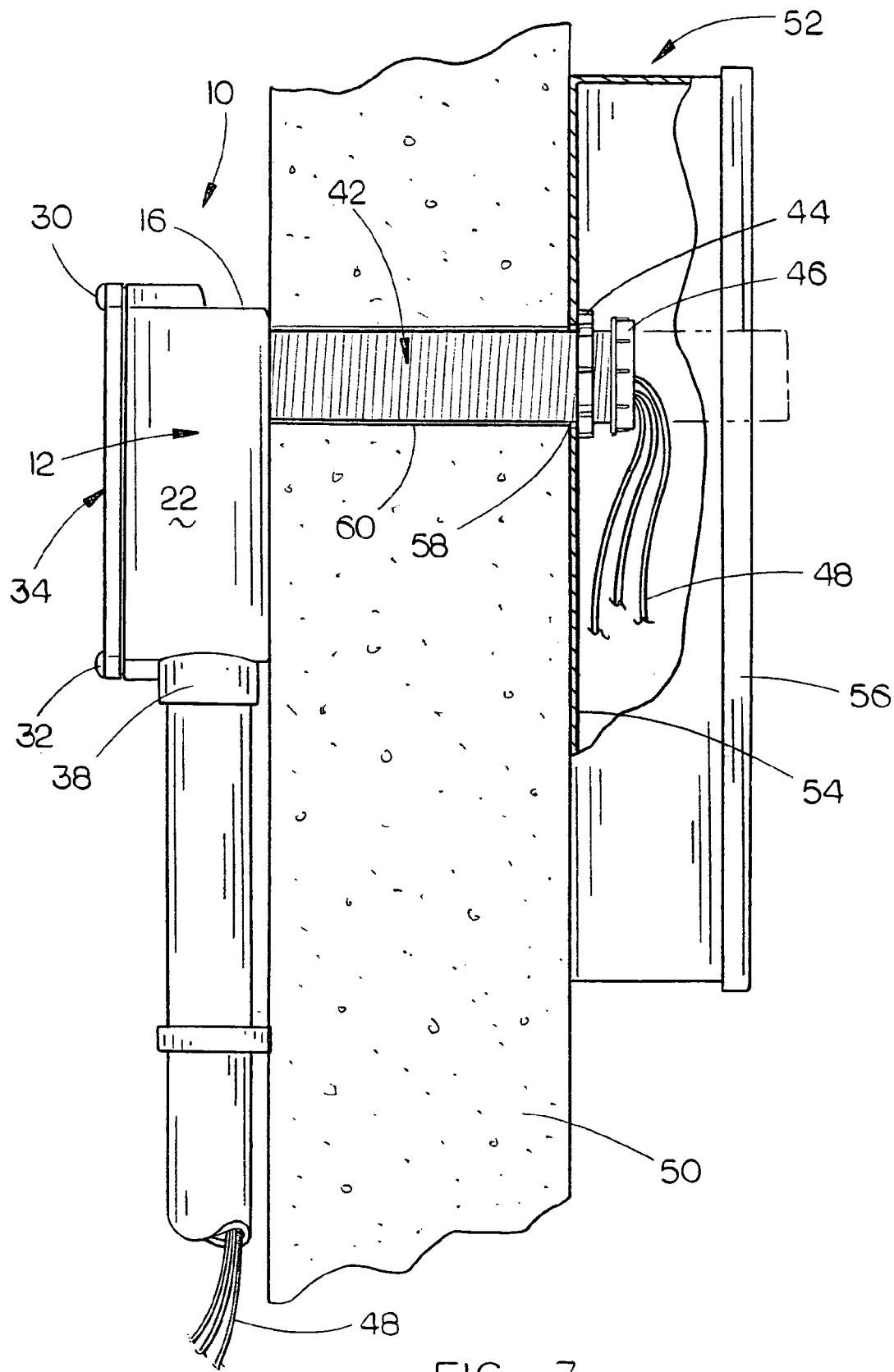
FIG. 3 is a sectional view of a building wall illustrating the conduit body of this invention extending through the wall into an electrical panel positioned at the inside surface of the wall with portion thereof cut-away to more fully illustrate the invention.
Figure 4:
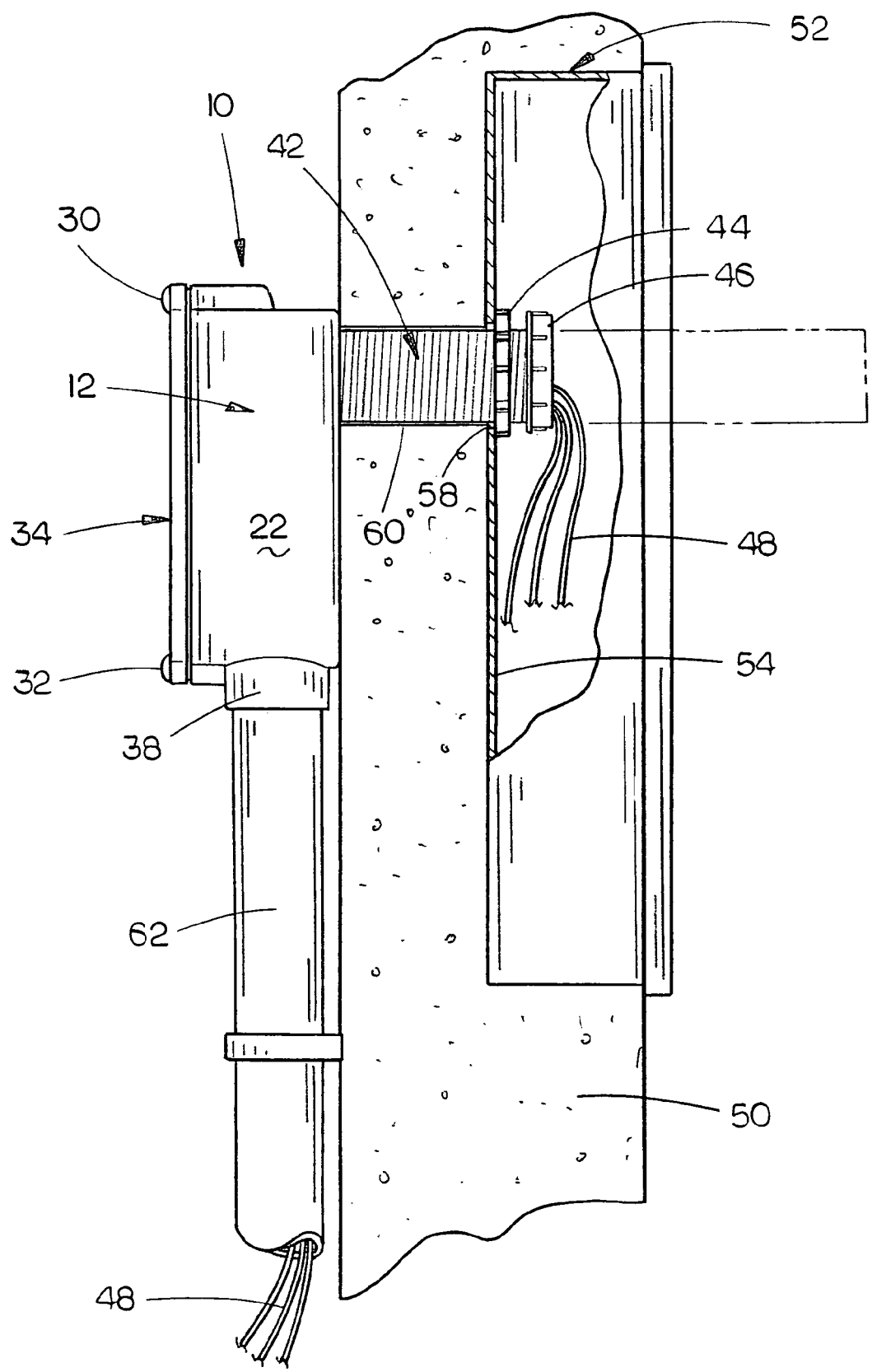
FIG. 4 is a view similar to FIG. 3 except that the panel is embedded in the inner surface of the building wall which requires that a longer portion of the nipple be removed to compensate for the effective wall thickness.

The conduit body 10 of this invention is designed to facilitate pulling electrical or telecommunication wires 48 through the wall 50 of a building structure to a panel 52 having a back wall 54 and a cover 56 spaced outwardly of back wall 54. The wall 50 of FIGS. 3 and 4 is shown to be constructed of concrete although the wall 50 could be constructed of wood, etc. Back wall 54 of panel 52 has an opening 58 formed therein which registers with an opening 60 formed in wall 50. As seen in FIG. 4, the panel 52 may be recessed in wall 50. In other situations, the thicknesses of the wall 50 may vary. The numeral 62 refers to a conduit through which the wires 48 pass upwardly therethrough. The upper end of conduit 62 is secured to coupling 38 by any convenient means.

In use, if it is desired to extend the upwardly extending electrical wires 48, which extend through a conduit 62, into the interior of a building structure having the electrical or telecommunications panel 52 mounted on the interior surface of the building wall 50, an opening 60 is formed in the wall 50 (FIG. 4).

The conduit body 10 is then maneuvered so that the nipple 42 is extended through the opening 60 and into the panel 52. The nipple 42 is then marked so as to indicate the proper length of the nipple 42 which should extend into the panel 52. As seen in FIG. 3, if the nipple 42 would extend completely outwardly from the panel 52, a certain amount of the nipple 42 must be removed therefrom so as not to interfere with the components in the panel 52 and to enable the cover 56 to be closed.

After the nipple 42 has been marked with the proper marking, the conduit body 10 is removed from the building wall 50 and a portion of the nipple 42 is cut or removed therefrom. The upper end of the conduit 62 is then secured to the coupler 38 by any convenient means and the nipple 42, after having been cut to the proper length, is then extended through the opening 60 and through the opening 58 in the panel 52. The lock nut 44 is then threadably mounted on the inner end of the nipple 42 to draw the conduit body 10 and the panel 52 towards one another so as to firmly position the conduit body 10 and the panel 52. If the electrical wires 48 have not been previously extended through the nipple 42, they are so extended at this time. If the bushing 46 has not been previously threadably mounted on the inner end of the nipple 42, it is so installed at this time. The bushing 46 serves to prevent any sharp surfaces of the nipple 42 from coming into contact with the electrical wires 48 as they are pulled through the conduit body 10, the nipple 42 and into the interior of the panel 52.

FIG. 4 illustrates a scenario wherein the panel 52 is embedded in the wall 50 which requires more of the nipple 42 be removed or cut therefrom so that the inner end of the nipple 42 does not objectionably protrude into the panel 52.

Thus, it can be seen that a novel conduit body has been provided which includes a nipple 42 extending from the back wall of the conduit body and which is integrally formed therewith to enable the nipple 42 to be extended into the interior of the panel 52 without the need for gluing the nipple 42 to the body portion 12.

It can therefore be seen that the conduit body of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A conduit body, comprising:
    a generally hollow rectangular body portion having a back wall, a top wall, a bottom wall, a first side wall, a second side wall and an open front which define an interior compartment;
    said open front of said body portion being closed by a selectively removable cover member;
    said bottom wall having a first opening formed therein;
    said back wall having a second opening formed therein;
    a hollow conduit coupling hub integrally formed with said bottom wall and extending downwardly from said first opening to define a first conduit passageway into the interior compartment of said body portion;
    an elongated exteriorly threaded nipple, having first and second ends, integrally formed with said back wall of said conduit body and extending rearwardly from said second opening to define a second conduit passageway.

2. The conduit body of claim 1 wherein said body portion, said coupling hub and said nipple are of one-piece molded plastic construction.

3. The conduit body of claim 1 wherein said nipple has a length of approximately 16 inches.

4. The conduit body of claim 1 wherein said nipple has a length of approximately 12 inches.

5. The conduit body of claim 1 further including an internally threaded lock nut adapted to be threadably mounted on said nipple.

6. The conduit body of claim 1 further including a bushing threadably mounted on said second end of said nipple.

7. In combination with a building wall having interior and exterior surfaces with an electrical panel, having a back wall, positioned at the interior surface of the building wall with the back wall of the panel being adjacent the interior surface of the wall, the back wall of the panel having an opening formed therein which communicates with an opening extending through the building wall, comprising:
   a generally hollow rectangular body portion having a back wall, a top wall, a bottom wall, a first side wall, a second side wall and an open front which define an interior compartment;
   said open front of said body portion being closed by a selectively removable cover member;
   said bottom wall having a first opening formed therein;
   said back wall having a second opening formed therein;
   a hollow conduit coupling hub integrally formed with said bottom wall and extending downwardly from said first opening to define a first conduit passageway into the interior compartment of said body portion;
   an elongated exteriorly threaded nipple, having first and second ends, integrally formed with said back wall of said conduit body and extending rearwardly from said second opening to define a second conduit passageway;
   a lock nut threadably mounted on said nipple and being in engagement with the back wall of the panel to draw the panel and said body portion into close engagement with the interior surface of the building wall and the exterior surface of the building wall respectively.

8. The combination of claim 7 wherein the nipple is cut to length and the bushing is threadably mounted on the second end of the nipple.

9. The method of mounting a conduit body on the exterior surface of a building wall having interior and exterior surfaces with an electrical panel, having a back wall, positioned at the interior surface of the building wall with the back wall of the panel being adjacent the interior surface of the wall, the back wall of the panel having an opening formed therein which communicates with an opening extending through the building wall, providing a generally hollow rectangular body portion having a back wall, a top wall, a bottom wall, a first side wall, a second side wall and an open front which define an interior compartment; said open front of said body portion being closed by a selectively removable cover member; said bottom wall having a first opening formed therein; said back wall having a second opening formed therein; a hollow conduit coupling hub integrally formed with said bottom wall and extending downwardly from said first opening to define a first conduit passageway into the interior compartment of said body portion; an elongated exteriorly threaded nipple, having first and second ends, integrally formed with said back wall of said conduit body and extending rearwardly from said second opening to define a second conduit passageway;
   inserting the nipple of the conduit body into opening in the building wall so that the nipple extends through the opening in the back wall of the panel;
   removing a portion of the nipple, by securing, so that the end of the nipple does not objectionably protrude into the panel;
   threading a lock nut onto the nipple so that the conduit body and panel are drawn together into engagement with the building wall; and
   threading a bushing onto the nipple.

10. A conduit body, comprising:
    a generally hollow rectangular body portion having a back wall, a top wall, a bottom wall, a first side wall, a second side wall and an open front which define an interior compartment;
    said open front of said body portion being closed by a selectively removable cover member;
    said body portion having a first opening formed therein;
    said back wall having a second opening formed therein;
    a hollow conduit coupling hub integrally formed with said body portion and extending into said first opening to define a first conduit passageway into the interior compartment of said body portion;
    an elongated exteriorly threaded nipple, having first and second ends, integrally formed with said back wall of said conduit body and extending rearwardly from said second opening to define a second conduit passageway.

11. The conduit body of claim 10 wherein said body portion, said coupling hub and said nipple are of one-piece molded plastic construction.

12. The conduit body of claim 10 wherein said nipple has a length of approximately 16 inches.

13. The conduit body of claim 10 wherein said nipple has a length of approximately 12 inches.

14. The conduit body of claim 10 further including an internally threaded lock nut adapted to be threadably mounted on said nipple.

15. The conduit body of claim 10 further including a bushing threadably mounted on said second end of said nipple.

* * * * *